United States Patent
Sarel et al.

(10) Patent No.: US 8,325,182 B2
(45) Date of Patent: Dec. 4, 2012

(54) METHODS AND SYSTEMS TO SELECTIVELY BATCH-CULL GRAPHICS PRIMITIVES IN RESPONSE TO SAMPLE CULL RESULTS

(75) Inventors: Uzi Sarel, Megadim (IL); Arie Narkis, Kiryat Tivon (IL)

(73) Assignee: Intel Corporation, Santa Clara, CA (US)

( * ) Notice: Subject to any disclaimer, the term of this patent is extended or adjusted under 35 U.S.C. 154(b) by 1010 days.

(21) Appl. No.: 12/347,557

(22) Filed: Dec. 31, 2008

(65) Prior Publication Data

US 2010/0164969 A1    Jul. 1, 2010

(51) Int. Cl.
    *G06T 15/40*    (2006.01)
(52) U.S. Cl. ......... 345/421; 345/422; 345/501; 345/530
(58) Field of Classification Search ................ 345/421, 345/501, 530
    See application file for complete search history.

(56) References Cited

U.S. PATENT DOCUMENTS

| | | | | |
|---|---|---|---|---|
| 6,476,807 | B1 * | 11/2002 | Duluk et al. | 345/421 |
| 6,480,205 | B1 * | 11/2002 | Greene et al. | 345/631 |
| 6,489,955 | B1 * | 12/2002 | Newhall, Jr. | 345/419 |
| 6,606,097 | B1 * | 8/2003 | Fossum | 345/501 |
| 6,894,689 | B1 * | 5/2005 | Greene et al. | 345/422 |

\* cited by examiner

*Primary Examiner* — Michelle L Sams
(74) *Attorney, Agent, or Firm* — Garrett IP, LLC

(57) ABSTRACT

Methods and systems to sample a subset of primitives from a batch of primitives for cull/no-cull decisions, and to selectively perform a batch-cull operation on the batch of primitives in response to cull/no-cull decisions of the samples. Cull/no-cull decisions may be determined in response to one or more of a sign and magnitude of a z-component of a surface normal to corresponding primitives, using one or more primitive-independent, vertex-based cull codes, which may include a cull code based on 2-dimensional pixel space positions corresponding to the primitives. 2-dimensional pixel space positions may be pre-computed for vertices associated with a batch of primitives in advance of sampling culling.

20 Claims, 3 Drawing Sheets

METHODS AND SYSTEMS TO SELECTIVELY BATCH-CULL GRAPHICS PRIMITIVES IN RESPONSE TO SAMPLE CULL RESULTS

BACKGROUND

Computer based graphics processing may include culling of graphics primitives that are not viewable with respect to a reference view. Culling may be performed with respect to batches of primitives. Culling utilizes computational resources, but may reduce down-stream computational requirements.

BRIEF DESCRIPTION OF THE DRAWINGS/FIGURES

Figure 1:
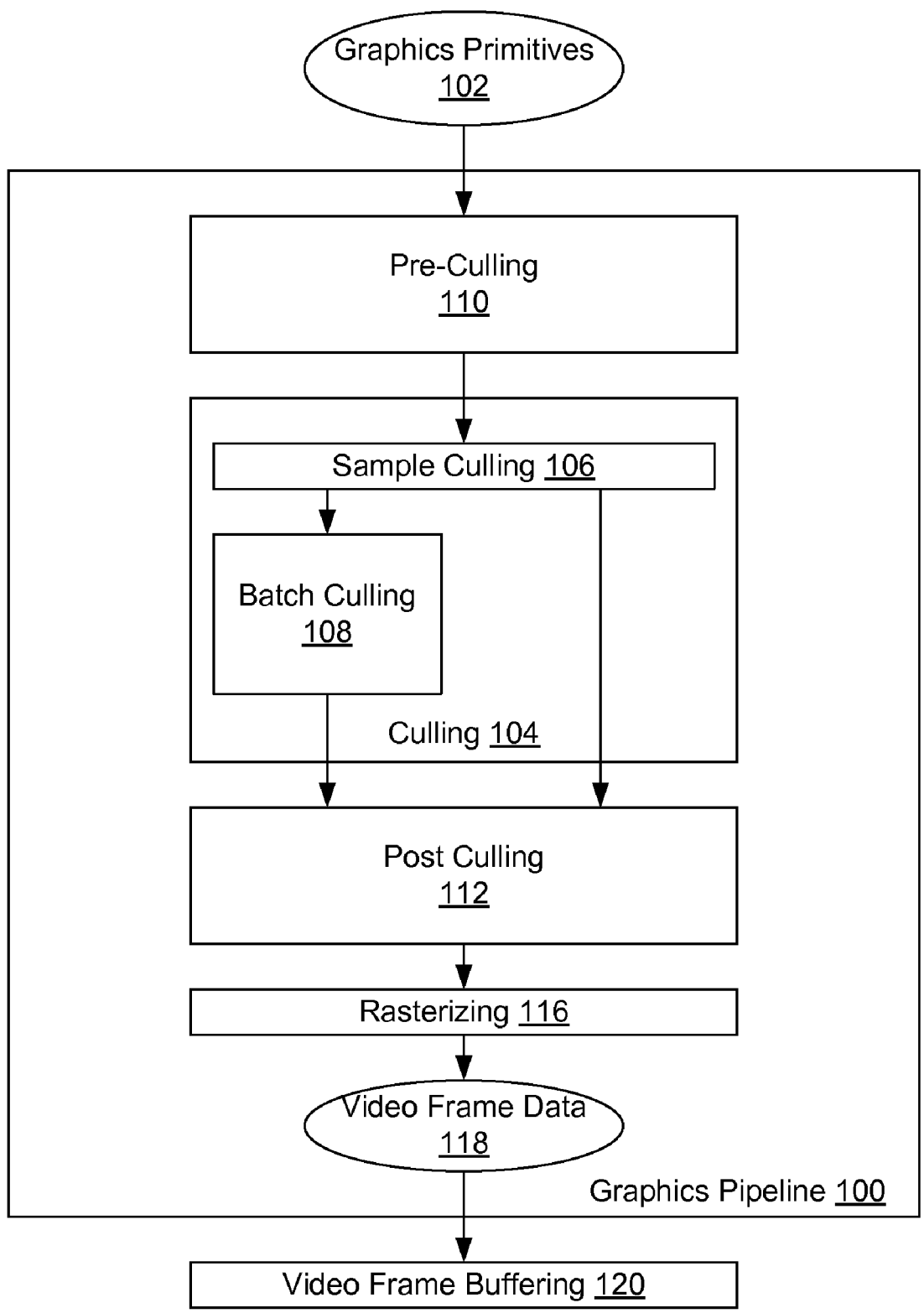
FIG. 1 is a graphical representation of an exemplary computer based graphics pipeline.

In the drawings, the leftmost digit(s) of a reference number identifies the drawing in which the reference number first appears.

DETAILED DESCRIPTION

FIG. 1 is a graphical representation of an exemplary computer-based graphics processing pipeline 100 to process batches of primitives 102.

The terms "primitive" and "primitives," as used herein, refer to computer-readable representations of geometric features, which may include lines, including straight lines, curved lines, line segments, and shapes, including polygons, such as triangles, and non polygons. Shapes may include 2-dimensional shapes and 3-dimensional shapes. Primitives may represent portions of objects in a 3-dimensional graphics environment, such as a 3-dimensional user-interactive gaming environment.

Graphics pipeline 100 includes one or more culling processes at 104, and may include one or more pre-culling processes at 110 and/or post-culling processes at 112. Graphics pipeline 100 may include one or more other processes in parallel with culling at 104.

Graphics pipeline 100 may include a rasterizing process at 116 to convert processed graphics primitives to video frame data 118. Video frame data 118 may be output for video frame buffering at 120 for a display, which may be local or remote relative to graphics pipeline 100.

Culling at 104 may generate decisions or recommendations to cull or not to cull (cull/no-cull decisions), with respect to primitives within a batch of primitives 102, in response to one or more criteria. Primitives that are assigned a cull decision may be culled or removed from a corresponding batch of primitives 102, or otherwise identified or tagged to preclude, reduce, or terminate further processing of the primitives within graphics pipeline 100. A cull/no-cull decision may be determinative with respect to the corresponding primitive, or may be one of a plurality of factors that are utilized in making a final cull/no-cull decision with respect to the primitive.

Culling at 104 may be performed with respect to a relative orientation of a primitive. For example, a cull decision may be generated for a primitive that faces away from a reference view, or a 2-dimensional primitive that is perpendicular relative to the reference view. A reference view may relate to a view cell or a view point.

A batch of primitives 102 may correspond to a common object or to multiple objects having similar relative orientations. For example, primitives within a batch of primitives 102 may correspond to a surface of an object in a 3-dimensional graphics environment. Where the surface faces the reference view, all or substantially all of the corresponding primitives may correspond to a no-cull decision.

In the example of FIG. 1, culling at 104 includes a sample culling process at 106 and a batch culling process at 108. In sample culling at 106, a sample set of primitives from a batch of primitives 102 is evaluated to determine whether to invoke or bypass batch culling at 108. Sample culling at 106 may be performed with respect to predetermined intervals of primitives, such as one out of 32 primitives.

Batch culling at 108 may be invoked when sample culling at 106 outputs a cull decision for one or more of the sampled primitives.

Batch culling at 108 may be bypassed when sample culling at 106 indicates that none or substantially none of the sampled primitives is identified for culling.

Pre-culling at 110, or culling at 104 may include computing 2-dimensional pixel space positions or coordinates for vertices associated with a batch of primitives 102, and sample culling at 106 may include generating cull decisions for sample primitives using the corresponding 2-dimensional vertex pixel space positions, as described below with reference to FIG. 2.

Figure 2:
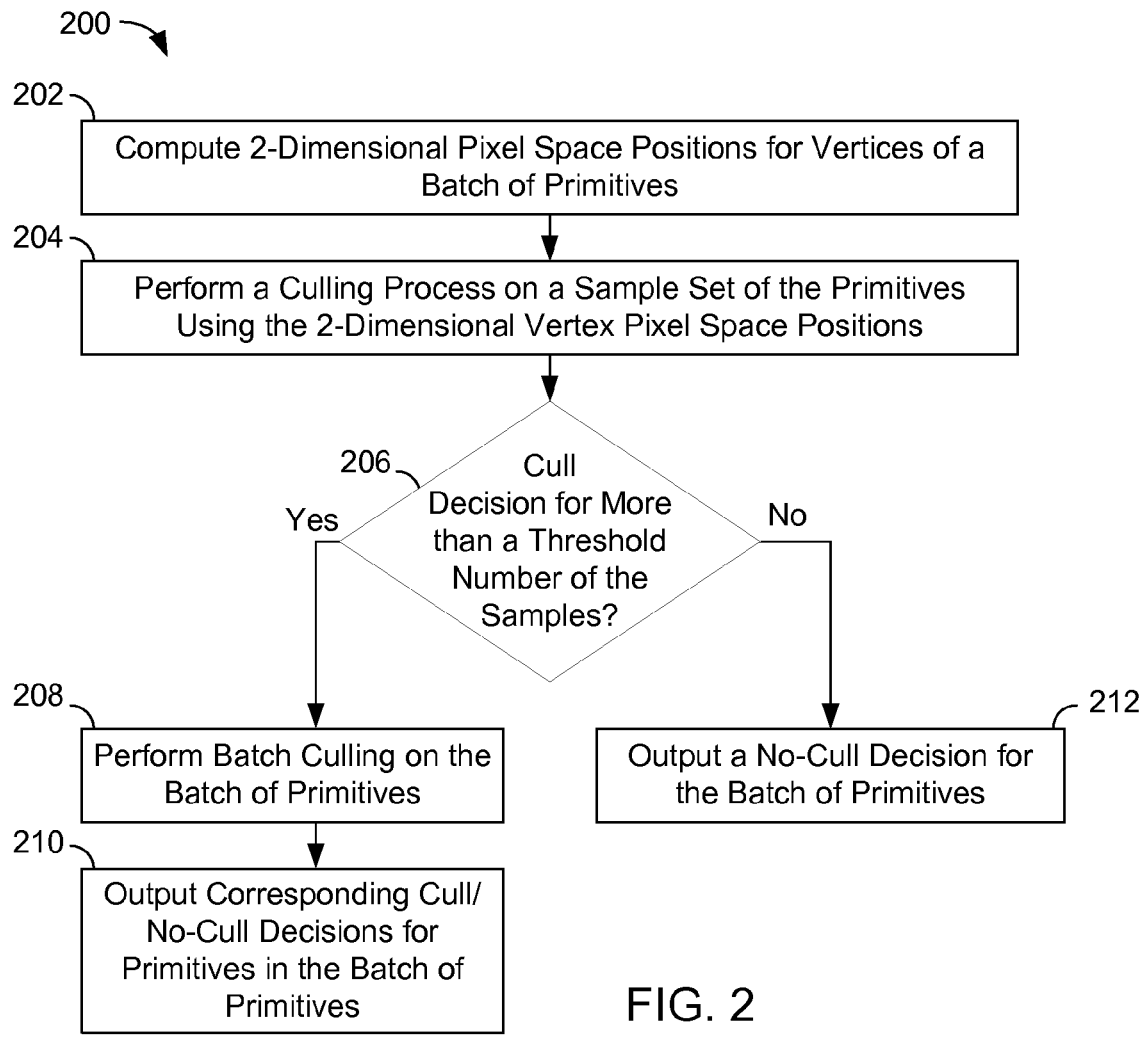
FIG. 2 is a process flowchart of an exemplary method of selectively performing batch culling.

FIG. 2 is a process flowchart of an exemplary method 200 of selectively performing batch culling.

At 202, 2-dimensional pixel space positions or coordinates are computed for vertices of a batch of primitives. The computation may include transforming a multi-bit floating position, such as a 32 bit floating position corresponding to a primitive, to a fixed-point number or coordinate in a 2-dimensional space.

Pre-computing of 2-dimensional vertex pixel space positions at 202 may avoid re-computing vertices that are common to multiple primitives within a batch of primitives.

At 204, culling is performed on a sample set of primitives from the batch of primitives.

Sample culling at 204 may include generating cull/no-cull decisions for the sample set of primitives using the corresponding 2-dimensional vertex pixel space positions computed at 202.

Sample culling at 204 may include determining a relative orientation of the sample set of primitives from the 2-dimensional vertex pixel space positions.

Sample culling at 204 may include evaluating a vector that is normal to a surface or plane of a primitive, referred to herein as a surface normal. Where the 2-dimensional vertex pixel space position of a primitive corresponds to an x and y coordinate plane, sample culling at 204 may include evaluating a z-component of the corresponding surface normal.

Figure 3:
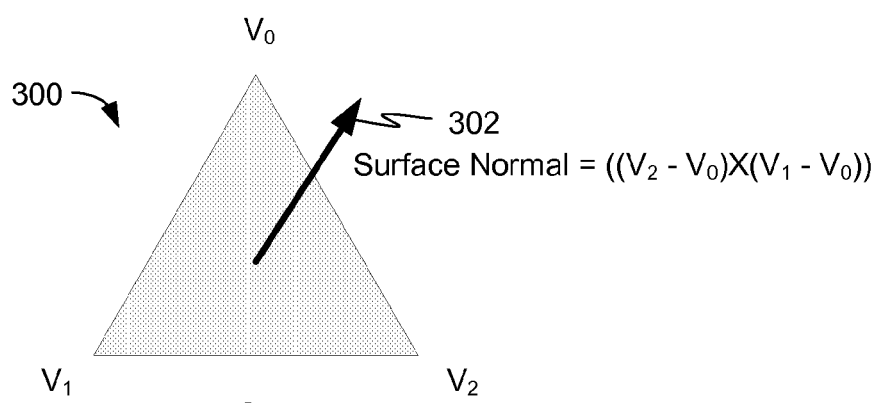
FIG. 3 is a graphic illustration of an exemplary graphics primitive.

For a polygon, such as a triangle, a surface normal may be calculated as a vector cross product of two non-parallel edges of the polygon. FIG. 3 is a graphic illustration of an exemplary triangle primitive 300, including vertices $V_0$, $V_1$, and $V_2$. Primitive 300 may be an equilateral triangle. A z-component of a surface normal 302 may be determined as:

$$(V_2-V_0) \times (V_1-V_0),$$

where "X" represents a vector cross product operation.

Sample culling at 204 may include generating a cull decision when a sign of the z-component corresponds to a primitive facing away from the reference view.

Sample culling at 204 may include generating a cull decision when a magnitude of the z-component is zero, corresponding to a primitive having zero pixel space area in the 2-dimensional pixel space, which may correspond to a primitive that faces substantially perpendicular to the reference view.

At 206, a determination or selection is made to perform or bypass batch culling at 208.

The determination at 206 may include determining to perform batch culling at 208 when a cull decision is generated at 204 for one or more of primitives within the sample set of primitives.

The determination at 206 may include determining to perform to perform batch culling at 208 when a number of cull decisions generated at 204 is greater than a threshold number, which may be adjustable.

Batch culling at 208 may be performed with respect to all of the primitives of the batch of primitives, or a subset thereof. For example, batch culling at 208 may be performed with respect primitives not already processed at 204.

Batch culling at 208 may include generating cull/no-cull decisions using the corresponding 2-dimensional vertex pixel space positions computed at 202, and may include evaluating a surface normal, such as described above with respect to 204.

At 210, cull/no-cull decisions generated at batch culling at 208 are output, which may include forwarding the cull/no-cull decisions to, or within a graphics pipeline.

Upon a determination at 206 to bypass batch culling at 208, a no-cull decision may be output with respect to the batch of primitives at 212. The no-cull decision may be forwarded to or within the graphics pipeline.

One or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The term software, as used herein, refers to a computer program product including a computer readable medium having computer program logic stored therein to cause a computer system to perform one or more features and/or combinations of features disclosed herein.

Figure 4:
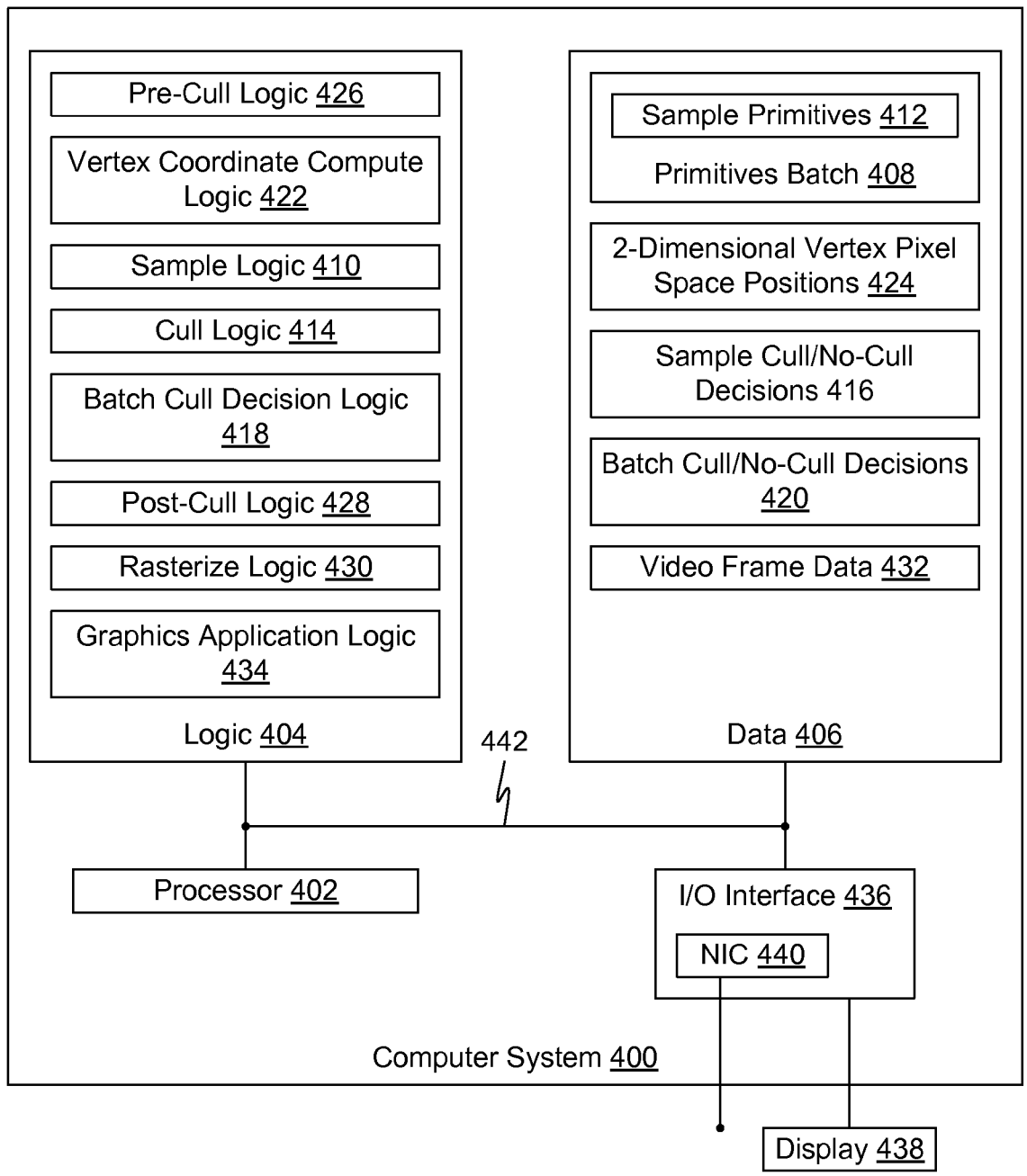
FIG. 4 is a block diagram of an exemplary computer system.

FIG. 4 is a block diagram of an exemplary computer system 400 including one or more computer instruction processing units, illustrated here as a processor 402, to execute computer program product logic, also known as instructions, code, and software.

Computer system 400 includes logic 404, which may include one or more of integrated circuit logic and computer program product logic stored on a computer readable medium to cause processor 402 to perform one or more functions in response thereto.

Computer system 400 includes data 406, which may include data to be processed in accordance with logic 404, and data generated in response to logic 404. Data 406 may include graphics primitives, illustrated here as primitives batch 408.

Logic 404 includes sample logic 410 to cause processor 402 to select a sample set of primitives (primitive samples) 412 from primitives batch 408, and to invoke cull logic 414 with respect to primitive samples 412. Cull logic 414 includes logic to cause processor 402 to compute sample cull/no-cull decisions 416 for primitive samples 412.

Logic 404 includes batch cull decision logic 418 to cause processor 402 to invoke cull logic 414 with respect to primitives batch 408 upon one or more conditions, such as described above with respect to 104 in FIGS. 1 and 206 in FIG. 2.

Logic 404 may include vertex coordinate compute logic 422 to cause processor 402 to compute 2-dimensional vertex pixel space positions (2D vertex PSPs) 424 associated with primitives batch 408, such as described above with respect to 202 in FIG. 2.

Logic 404 may include logic to cause processor 402 to invoke vertex coordinate compute logic 422 prior to invoking cull logic 414.

Cull logic 414 may include logic to cause processor 402 to compute cull/no-cull decisions for a plurality of primitives in parallel using pre-computed 2D vertex PSPs 424. Logic 404 may include logic to cause processor 402 to implement multi-threading and instruction-level parallelism with respect to cull logic 414. Cull logic 414 may include single-instruction, multiple-data (SIMD) logic, and may include extensions thereof, including a Streaming SIMD Extension-2 (SSE2).

Logic 404 may include logic to cause processor 402 to compute sample cull/no-cull decisions 416 and/or batch cull/no-cull decisions 420 substantially immediately following generation of 2D vertex PSPs 424, which may improve data locality.

Processor 402 may represent one or more of a general purpose computer processor and a graphics processor or graphics processing unit (GPU). Logic 404 and/or data 406, or portions thereof, may reside in memory, which may include one or more of system memory and graphics memory. 2D vertex PSPs 424 may be processed into graphics memory, and sample cull/no-cull decisions 416 and/or batch cull/no-cull decisions 420 may be written to system memory independent of vertex data writes. Alternatively, 2D vertex PSPs 424 may be processed into system memory, cull/no-cull decisions may be generated from vertex coordinates 424 in system memory, and 2D vertex PSPs 424 may thereafter be copied to graphics memory.

Logic 404 may include one or more of pre-cull logic 426 and post-cull logic 428 to cause processor 402 to perform one or more corresponding pre-cull operations and/or post-cull operations, such as described above with respect to 110 and 112, respectively in FIG. 1.

Logic 404 may include rasterize logic 430 to cause processor 402 to convert processed graphics primitives to video frame data 432, such as described above with respect to 116 and 118 in FIG. 1.

Primitives batch 408 may be associated with a user-interactive graphics environment, such as a user-interactive 3-dimensional gaming environment, and logic 404 may include corresponding graphics application logic 434 to cause processor 402 to select primitives batch 408 from a repository of graphics data associated with graphics application logic 434 in response to user-input.

Computer system 400 may include an input/output (I/O) interface 436, to output video frame data 432 to a display 438.

I/O interface 436 may include a network interface card (NIC) 440 to interface between processor 402 and a network. Logic 404 may include logic to cause processor 402 to send and/or receive data 406, or portions thereof, and/or user-input data through NIC 440.

Computer system 400 may include a communication infrastructure 442 to interface between processor 402, logic 404, data 406, and I/O interface 440.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

What is claimed is:

1. A computer-implemented method, comprising:
    pre-computing 2-dimensional vertex pixel space positions of vertices associated with a batch of multiple graphics primitives prior to performing a sample culling operation;
    performing the sample culling operation on graphics primitives within a sample set of less than all of the graphics primitives of the batch, including applying a primitive-independent vertex-based cull code to the corresponding pre-computed 2-dimensional vertex pixel space positions; and
    determining to perform a batch culling operation on the batch of graphics primitives based on results of the sample culling operation.

2. The method of claim 1, wherein the determining includes:
    determining to perform the batch culling operation on the batch of graphics primitives when the sample culling operation results in a cull decision with respect to at least a threshold number of graphics primitives of the sample set of graphics primitives; and
    associating a no-cull decision with the batch of graphics primitives when the sample culling operation results in a cull decision with respect to less than the threshold number of graphics primitives of the sample set of graphics primitives.

3. The method of claim 2, further including, wherein the performing the batch culling operation on the batch of graphics primitives includes applying the primitive-independent vertex-based cull code to the corresponding pre-computed 2-dimensional vertex pixel space positions.

4. The method of claim 2, further comprising, performing the batch culling operation on the batch of graphics primitives only with respect to graphics primitives that are not part of the sample set.

5. The method of claim 1, wherein the performing the sample culling operation includes:
    determining a z-component of a surface normal for graphics primitives of the sample set from the corresponding 2-dimensional vertex pixel space positions; and
    associating a cull decision with a graphics primitive based at least in part on the corresponding z-component.

6. The method of claim 5, wherein the associating includes:
    associating a cull decision with the graphics primitive when a sign of the z-component corresponds to a back-facing primitive.

7. The method of claim 5, wherein the associating includes:
    associating a cull decision with a graphics primitive when a magnitude of the z-component corresponds to zero pixel space area.

8. The method of claim 5, wherein the determining the z-component includes:
    determining the z-component in accordance with $((V_2-V_0) \times (V_1-V_0))$,
    where $V_0$, $V_1$, and $V_2$ represent the 2-dimensional vertex pixel space positions of a corresponding graphics primitive.

9. The method of claim 5, wherein the determining of the surface normal includes computing a vector cross product of two non-parallel edges of the graphics primitive.

10. The method of claim 1, wherein the computing of the pre-computing 2-dimensional vertex pixel space positions includes translating a multi-bit floating position to a fixed-point coordinate in a 2-dimensional pixel space.

11. A non-transitory computer readable medium encoded with a computer program, including instructions to cause a processor to:
    pre-compute 2-dimensional vertex pixel space positions of vertices associated with a batch of graphics primitives prior to performing a sample culling operation;
    perform the sample culling operation on a sample set of less than all of the graphics primitives of the batch, including applying a primitive-independent vertex-based cull code to the corresponding pre-computed 2-dimensional vertex pixel space positions; and
    determine to perform a batch culling operation on the batch of graphics primitives based on results of the sample culling operation.

12. The computer readable medium of claim 11, further including instructions to cause the processor to:
    determine to perform the batch culling operation on the batch of graphics primitives when the sample culling operation results in a cull decision with respect to at least a threshold number of graphics primitives of the sample set of graphics primitives; and
    associate a no-cull decision with the batch of graphics primitives when the sample culling operation results in a cull decision with respect to less than the threshold number of graphics primitives of the sample set of graphics primitives.

13. The computer readable medium of claim 12, further including instructions to cause the processor to perform the batch culling operation, including to apply the primitive-independent vertex-based cull code to the corresponding pre-computed 2-dimensional vertex pixel space positions.

14. The computer readable medium of claim 12, further including instructions to cause the processor to perform the batch culling operation on the batch of graphics primitives only with respect to graphics primitives that are not part of the sample set.

15. The computer readable medium of claim 11, further including instructions to cause the processor to:
    determine a z-component of a surface normal for graphics primitives of the sample set from the corresponding 2-dimensional vertex pixel space positions; and
    associate a cull decision with a graphics primitive based at least in part on the corresponding z-component.

16. The computer readable medium of claim 15, further including instructions to cause the processor to:
    associate a cull decision with a graphics primitive when a magnitude of the z-component corresponds to zero pixel space area.

17. The computer readable medium of claim 15, further including instructions to cause the processor to:
    determine the z-component in accordance with $((V_2-V_0) \times (V_1-V_0))$,
    where $V_0$, $V_1$, and $V_2$ represent the 2-dimensional vertex pixel space positions of a corresponding graphics primitive.

18. A system, comprising:
    a computer system configured to pre-compute 2-dimensional vertex pixel space positions of vertices associated with a batch of graphics primitives prior to performing a sample culling operation, perform the sample culling operation on graphics primitives within a sample set of less than all of the graphics primitives of the batch, including applying a primitive-independent vertex-based cull code to the pre-computed corresponding pre-computed 2-dimensional vertex pixel space positions, and determine to perform a batch culling operation on the batch of graphics primitives based on results of the sample culling operation.

19. The system of claim 18, wherein the computer system includes system memory and graphics memory, wherein the primitive-independent vertex-based cull code is written to the system memory independent of vertex data writes, and wherein the computer system is further configured to process the 2-dimensional vertex pixel space positions to the graphics memory.

20. The system of claim 19, wherein the computer system is further configured to apply the primitive-independent vertex-based cull code to the pre-computed 2-dimensional vertex pixel space positions with multi-threading and instruction-level parallelism.

* * * * *